United States Patent
Barlag et al.

(10) Patent No.: US 9,399,325 B2
(45) Date of Patent: Jul. 26, 2016

(54) METHOD AND DEVICE FOR LAYING AND DRAPING PORTIONS OF A REINFORCING FIBER STRUCTURE TO PRODUCE A PROFILED PREFORM

(75) Inventors: Carsten Barlag, Jever (DE); Rolf Sundermann, Buxtehude (DE); Georg Lonsdorfer, Stade (DE); Guenther Dressler, Immenstaad (DE); Christian Baumgartner, Frickingen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/074,308

(22) Filed: Mar. 29, 2011

(65) Prior Publication Data

US 2011/0240213 A1  Oct. 6, 2011

Related U.S. Application Data

(63) Continuation of application No. PCT/EP2009/061383, filed on Sep. 3, 2009.

(60) Provisional application No. 61/102,236, filed on Oct. 2, 2008.

(30) Foreign Application Priority Data

Oct. 2, 2008 (DE) .......................... 10 2008 042 574

(51) Int. Cl.
*B29C 70/38* (2006.01)
*B29C 70/54* (2006.01)
(Continued)

(52) U.S. Cl.
CPC ............. *B29C 70/388* (2013.01); *B29C 70/543* (2013.01); *B29C 70/86* (2013.01); *B29C 70/48* (2013.01)

(58) Field of Classification Search
CPC .......................................... B29C 70/38–70/388
USPC ........... 156/361, 512, 517, 523, 576; 425/123
See application file for complete search history.

(56) References Cited

U.S. PATENT DOCUMENTS 3,775,238 A * 11/1973 Lyman ......................... 428/167
4,285,752 A *  8/1981 Higgins ....................... 156/250
(Continued)

FOREIGN PATENT DOCUMENTS

DE  10 2006 052 592 A1  5/2008
DE  10 2006 060 361 A1  6/2008
(Continued)

OTHER PUBLICATIONS

International Search Report for International Application No. WO 2010/037612 A1 dated Jan. 14, 2010.
(Continued)

*Primary Examiner* — William Bell
(74) *Attorney, Agent, or Firm* — Jenkins, Wilson, Taylor & Hunt, P.A.

(57) ABSTRACT

A device for automatically laying and draping a plurality of web-form portions of a dry sheet-like formation, in particular of a multiaxial laid fiber fabric and/or a woven reinforcing fabric to create a profiled preform on a core by repeated laying and draping of the portions in order to produce a reinforcing profile with a composite material. Accordingly at least one portion, is kept in at least one cassette between two roller conveyors ready for laying on the core. As a result of the preferably simultaneous laying of preferably more than one prefabricated portion of the sheet-like formation on the core by means of at least one cassette of the cassette arrangement a profiled preform can be fully automatically laid and draped quickly and with great dimensional accuracy and at the same time with good reproducibility for the production of CRP profiles.

10 Claims, 5 Drawing Sheets

(51) Int. Cl.
  *B29C 70/86* (2006.01)
  *B29C 70/48* (2006.01)

(56) References Cited

U.S. PATENT DOCUMENTS

| | | | |
|---|---|---|---|
| 4,381,587 A * | 5/1983 | Cho | 26/78 |
| 5,290,167 A * | 3/1994 | Tanaka et al. | 425/397 |
| 5,447,586 A * | 9/1995 | Tam | 156/64 |
| 5,827,460 A * | 10/1998 | Brentrup et al. | 264/171.23 |
| 5,954,917 A | 9/1999 | Jackson | |
| 6,096,164 A * | 8/2000 | Benson et al. | 156/425 |
| 2003/0132543 A1 | 7/2003 | Gardner | |
| 2005/0023414 A1* | 2/2005 | Braun | 244/120 |
| 2005/0039843 A1* | 2/2005 | Johnson et al. | 156/175 |
| 2005/0039844 A1* | 2/2005 | Engwall | B29C 53/72 156/180 |
| 2005/0209735 A1 | 9/2005 | Groppe | |
| 2006/0011289 A1 | 1/2006 | Suriano | |
| 2009/0301648 A1* | 12/2009 | Hogg et al. | 156/230 |

FOREIGN PATENT DOCUMENTS

| | | |
|---|---|---|
| EP | 1 342 554 A1 | 9/2003 |
| GB | 2 268 705 A | 1/1994 |
| WO | WO 9308322 A1 * | 4/1993 |

OTHER PUBLICATIONS

German Office Action for German Application No. DE 10 2008 042 574.5-16 dated Jun. 2, 2009.
Chinese Office Action for CN 200980139235-6 dated Aug. 26, 2013.

* cited by examiner

METHOD AND DEVICE FOR LAYING AND DRAPING PORTIONS OF A REINFORCING FIBER STRUCTURE TO PRODUCE A PROFILED PREFORM

CROSS-REFERENCE TO RELATED APPLICATIONS

This application is a continuation of PCT/EP2009/061383 filed Sep. 3, 2009 and claims the benefit of and priority to U.S. Provisional Application No. 61/102,236, filed Oct. 2, 2008 and German Patent Application No. 10 2008 042 574.5, filed Oct. 2, 2008, the entire disclosures of which are herein incorporated by reference.

FIELD OF THE INVENTION

The invention relates to a device for automatically laying and draping a plurality of web-form portions of a sheet-like formation, in particular of a multiaxial laid fiber fabric and/or a woven reinforcing fabric, to create a profiled preform on a core by repeated laying and draping of the portions, in order to produce a reinforcing profile by impregnating the profiled preform with a curable plastics material in a moulding tool.

Components made of composite materials, in particular carbon fiber reinforced epoxy resins (CFRP), are being used increasingly in modern aircraft construction. However, largely automatic production of components of this type in large numbers with low tolerances still poses a manufacturing problem. Thus far, it has only been possible to produce these components with a relatively high proportion of manual labour, and with resulting inaccuracies and high costs, and this has thus far prevented comprehensive use in the mass production of civilian aircraft.

In order to overcome the aforementioned drawbacks, increasing attention is being paid for example to the use of what are known as wet technologies, such as the known resin transfer moulding (RTM) method. In this type of method, in CFRP components of a complex geometry, preformed dry reinforcing fiber structures (known as preforms) are laid in generally multi-part moulding tools, which are configured to correspond to the preforms, and subsequently impregnated with a curable plastics material, for example an epoxy resin system, with simultaneous application of pressure and temperature. Subsequently, the preform, which is fully saturated with the curable plastics material, is cured at a temperature of up to 200° C. In this type of method, the use of the outline-defining moulding tool provides a high dimensional accuracy and potentially the capacity for mass production. However, one problem which thus far is largely unsolved is the automated production of the preforms, which are still required for this type of method and which in some cases must additionally be provided with a binder if it is to be possible to handle them in the first place, subsequent stitching also being conceivable.

Nowadays, preforms of this type for complex, curved CFRP profiles are produced by laying preformed semi-finished fiber products, such as a multiaxial laid fiber fabric (MAF), a non-woven fabric or a woven fabric. For this purpose, the blanks are cut out from rolls, laid on a core to shape the preform, and subsequently draped in accordance with the required surface geometry and the specific individual case, predominantly manually, using various techniques and various auxiliary devices. In the context of this application, the term "draping" is defined in particular as largely fold-free shaping of an initially planar reinforcing laid fiber fabric into a surface geometry curved in at least one spatial direction, the individual reinforcing fibers which extend over one another sliding over one another and changing in the angle thereof relative to one another in crossover regions.

Further, what is known as the TFP laying process (tailored fiber placement) is known for producing dry preforms. In this process, relatively narrow reinforcing fiber strands are laid successively alongside and on top of one another on a textile substrate and subsequently fixed in position. This TFP laying process does make a high degree of automation possible, as well as the creation of preforms having virtually any surface geometry, but is extremely time-consuming. Further, the substrate represents a foreign body in the finished composite component, and the fixing can lead to warping (undulations) in the reinforcing fiber strands.

It is further known to produce preforms in a winding process by winding onto a rotating mandrel. The winding process is suitable in particular for rotationally symmetric preforms, and moreover is well adapted to automation. However, a drawback is that the surface geometry which can be achieved for the preforms is basically limited to round bodies.

In addition, numerous knitting, crochet and braiding processes are known for producing elongate preforms, from which preforms having for example a Z-shaped or U-shaped cross-sectional geometry can subsequently be formed in a second step by complex bending or folding processes. However, the bending processes can only be automated with great difficulty and consequently cannot be reliably reproduced. Further, it is not possible to form reinforcing regions in portions in this manner.

SUMMARY OF THE INVENTION

The object of the invention is largely to eliminate the above-mentioned drawbacks of the known methods and to provide a device, which makes it possible to produce preforms in a manner adapted to mass production, for producing reinforcing profiles which are curved at least in one dimension from a composite material, for example a carbon fiber reinforced epoxy resin system.

This object is initially achieved by a device having the features of claim 1.

A profiled preform for producing a straight and/or curved profile can be laid and draped rapidly in that at least one portion is held ready for laying on the core in at least one cartridge between two roller conveyors, since each required layer of at least one portion is held ready in at least one cartridge and is withdrawn therefrom for the laying and draping process. In this case, the cartridge comprises two opposingly arranged roller conveyors for receiving the portion to be laid and draped.

However, the device preferably comprises at least three cartridges, combined into what is a so-called cartridge arrangement, for receiving and holding ready at least three portions which extend over the entire longitudinal extent of the generally curved profile, in such a way that these at least three portions are withdrawn from the cartridges simultaneously for laying and draping.

To make it possible to withdraw the individual portions of the reinforcing fiber sheet-like formation from the cartridge, each of these cartridges at least comprises opposingly arranged roller conveyors between which the portion of the sheet-like formation is received. Each roller conveyor is in turn formed with a plurality of rollers. The sheet-like formation processed by the device is preferably a multiaxial laid fabric formed from carbon fibers. The portions withdrawn from the cartridge or cartridges are laid on a core, the surface geometry of which approximately corresponds to an internal surface geometry of the profiled preform to be produced. The portions are of a length approximately corresponding to the perimeter of the core, which comprises a front face, a rear face and an upper face, plus an allowance for a potential subsequent trimming of the profiled preform.

After one layer has been completely laid and draped, the at least one cartridge is re-equipped or reloaded with a blank of the sheet-like formation, and the laying and draping process is repeated until a predetermined material thickness of the profiled preform is achieved.

If there are at least two cartridges, they may be mutually articulated, in such a way that a handling means, for example an articulated arm robot having a plurality of degrees of freedom or a gantry robot, is sufficient for jointly positioning the cartridges in space relative to the core. Alternatively, it is conceivable to configure each of the cartridges to be positionable individually in space, and this may for example be achieved by way of a respective handling means for each cartridge.

The cartridges are preferably re-equipped fully automatically with the portions of the sheet-like reinforcing fiber laid fabric, with at least one reserve roll for the laid fabric and at least one cutting means.

According to an advantageous embodiment of the device, at least three mutually articulated cartridges are provided so as to follow any desired curvature of the core. This means that it is no longer necessary to position each cartridge separately in space by means of an individual handling means for the laying, withdrawal and draping process. Moreover, the at least monoaxially curved outline of the core or of the profiled preform to be laid thereon is approximated by a polygon formed by the preferably adjacently arranged and mutually articulated cartridges.

The higher the number of the cartridges having the rollers within the device, the more precisely the cartridge arrangement can be approximated to a respective local curvature of the profiled preform. The articulations between the roller conveyors make it possible to pivot the roller conveyors out of the mutually parallelly spaced arrangement which they conventionally assume in the laying and draping process, for example to receive a new portion of the reinforcing fiber sheet-like formation from a reserve roll.

The articulations between the individual cartridges and between the roller conveyors may for example be formed with motorised servo controls, hydraulic pistons and/or pneumatic pistons as actuators, in such a way that the cartridge arrangement, generally comprising a number of cartridges having roller conveyors, can be adapted fully automatically, flexibly and rapidly to differently formed cores or profiled preforms to be laid.

A development of the device provides that the cartridges can be positioned freely in space by at least one handling means, in particular at least one articulated arm robot and/or gantry robot having at least six degrees of freedom.

This embodiment also makes it possible automatically to follow a two-dimensionally curved surface geometry of a core or of a profiled preform to be laid successively thereon, by means of an adapted continuous path system, and to have the portions laid and draped on the core fully automatically, with a high level of accuracy and in a highly reproducible manner.

In accordance with a further development of the device, the core has in particular a U-shaped, Z-shaped, L-shaped, I-shaped cross-sectional geometry or any desired combination thereof so as to create a profiled preform for an at least singly curved reinforcing profile. This makes it possible to produce reinforcing profiles from CFRP materials, such as stringer profiles, crossbar profiles or annular former segments for reinforcing an aircraft fuselage structure, which are required in very high numbers of typically several thousand, virtually fully automatically with short processing times, in conjunction with a high manufacturing and reproduction precision, by means of the device according to the invention. The curvature may be different in different portions, i.e. a radius of curvature of the profile need not necessarily be constant over the entire longitudinal extent thereof. In addition, the cross-sectional geometry may also vary in portions. This means that for example the width and/or the height of the preform to be laid or of a core for a rectangular profile may vary along the peripheral direction or longitudinal extent.

A development of the invention provides that in the region of a core front side and a core rear side, a gripping means is provided in each case. Initially, a portion, cut precisely to length in advance, of the reinforcing fiber sheet-like formation to be applied to the core is withdrawn from the cartridge. At this point, the start of the portion is fixed in the region of the front core by means of the front gripping means. Subsequently, the cartridge or the entire cartridge arrangement is drawn over the core with bias by means of the handling means, the portion being draped in curved regions and laid in planar core regions. When the cartridge containing the portion has reached the core rear side, the cartridge is guided a little further downwards over the core rear side, in such a way that the laid portion which is under a slight bias can be gripped on the core by means of the rear gripping means. Subsequently, the entire cartridge arrangement is displaced towards reserve rolls on which the reinforcing fiber sheet-like formation is stored. To reload the cartridge arrangement with the portions, the two roller conveyors each in a cartridge may for example be folded apart by an angle such that a portion of a defined length can be introduced between the roller conveyors of the cartridges from the reserve rolls. Subsequently, the reinforcing fiber sheet-like formation withdrawn from the reserve rolls is cut to the correct length by automated cutting means. The length of the portions corresponds in each case to the local length of the peripheral outline of the core, plus an allowance so as to make it possible to grip the start and end of the respective portion in place on the core and to carry out any trimming which may be required after the laying process is complete. Once the cartridge arrangement is reloaded with the portions of the reinforcing fiber sheet-like formation, which is in particular a multiaxial laid fabric comprising carbon fibers which are laid on top of one another at various angles (for example 90°, ±45°, 30°, 60° and 0°), a further layer of portions is laid on the core. This process is repeated until the required number of layers is achieved on the core. If necessary, the optional 0° layers are laid by an additional means, in particular a rolling means.

According to a further advantageous embodiment, it is provided that a web-form reinforcing fiber arrangement can be laid in particular in the region of the core front side and/or the core rear side by at least one rolling means which can be positioned freely in space.

In this way, 0° layers (in particular for absorbing the peripheral forces) may additionally be introduced into the layer construction of the profiled preform, and extend parallel to the longitudinal direction of the profiled preform or in the peripheral direction in the case of curved profiled preforms. These additional reinforcing fiber layers are of decisive importance for the strengths which can be achieved by the finished CFRP component if the reinforcing profile is for example to be used as an annular former or annular former segment, because in this region of the fuselage cell structure, very high peripheral stresses occur, and can basically only be absorbed by reinforcing fibers extending parallel to the peripheral direction. Thus, the device according to the invention makes possible fully automated production of a profiled preform, having an orientation of the reinforcing fibers arranged therein which is adapted to the distribution of forces or optimised so as to be free of forces, with low processing times, while simultaneously achieving high reproducibility and dimensional accuracy of the layer construction.

Moreover, the object according to the invention is achieved by a method according to claim 13, comprising the following steps:

a) creating a profiled preform by laying and draping portions of reinforcing fiber sheet-like formation on a core in layers, at least one portion being withdrawn from at least one cartridge,
b) laying the profiled preform in a moulding tool,
c) infiltrating and curing the profiled preform in the moulding tool with a curable plastics material with simultaneous application of pressure and temperature.

In this way, curved CFRP reinforcing profiles for reinforcing fuselage cell structures of aircraft can be produced fully automatically, with low processing times and a high reproduction and manufacturing precision, with a high dimensional accuracy. In principle, the method can be carried out with only one cartridge, in particular for profiles which are only slightly curved. However, two, three or more cartridges articulated to a cartridge arrangement may advantageously be used so as also to accelerate the laying and draping process on long, curved cores for the production for example of CFRP profiles for annular formers or the like.

In method step a) the actual profiled preform is formed by laying and draping portions of the reinforcing fiber sheet-like formation, which have previously been cut to the correct length, on the core in layers. For this purpose, the portions are withdrawn from the cartridges, laid on the core and in doing so draped in regions having a curved core surface geometry. The laying and draping process is repeated until the provided number of layers is achieved on the core. The layers of the portions already laid are fixed by means of a gripping means which is arranged in the region of the core front side and of the core rear side.

Where necessary, if not already comprised in the fiber material, in this method step a layer which is to be laid can be fixed by an application means. The application means comprises for example a suitable distribution means, such as a distribution box which is arranged above the core and which is filled with a binder. Alternatively, trickle or spray means may also be provided for applying the binder. The binder is preferably a fine powder of a thermoplastic and easily meltable material. After a layer of the reinforcing fiber sheet-like formation has been laid on the core and fixed by the gripping means, the binder is preferably initially applied in the region of a core upper side. Subsequently, a following layer of a portion of the reinforcing fiber sheet-like formation is laid. Afterwards, the distributed binder is melted by a heating means, which is preferably in the form of an electrically powered radiant heating system, and a rigid mechanical bond is thus produced between the two layers which lie on top of one another. The contact pressure required for this may be provided by a pressing means, such as a vacuum mat and/or a plunger. The plunger may be heatable by induction coils, an electric resistance heater, or a fluid circulating in the plunger, and/or be coolable by a cooling means, so as to achieve rapid temperature control of the consolidated profiled preform. In this case, the surface geometry of the plunger follows the predetermined target geometry of the profiled preform.

In method step b) the profiled preform which has already been produced is removed from the core and laid in a multipart moulding tool. Before and/or after removing the profiled preform from the core, it may be necessary to trim the edges of the profiled preform to provide the required dimensional accuracy.

After the profiled preform has been laid in the generally multipart moulding tool, in method step c) the profiled preform is infiltrated or impregnated and cured to form the component. For this purpose, a curable plastics material, in particular a suitable epoxy resin system, is introduced into the moulding tool under increased pressure, in such a way that the profiled preform is fully saturated. Subsequently, the profiled preform fully impregnated with the curable plastics material is cured with simultaneous application of pressure and temperature in the moulding tool to create the CFRP component, in particular the CFRP profile to be produced.

Further advantageous embodiments of the device and method are specified in the remaining claims.

DESCRIPTION OF EXEMPLARY EMBODIMENTS

Figure 1:
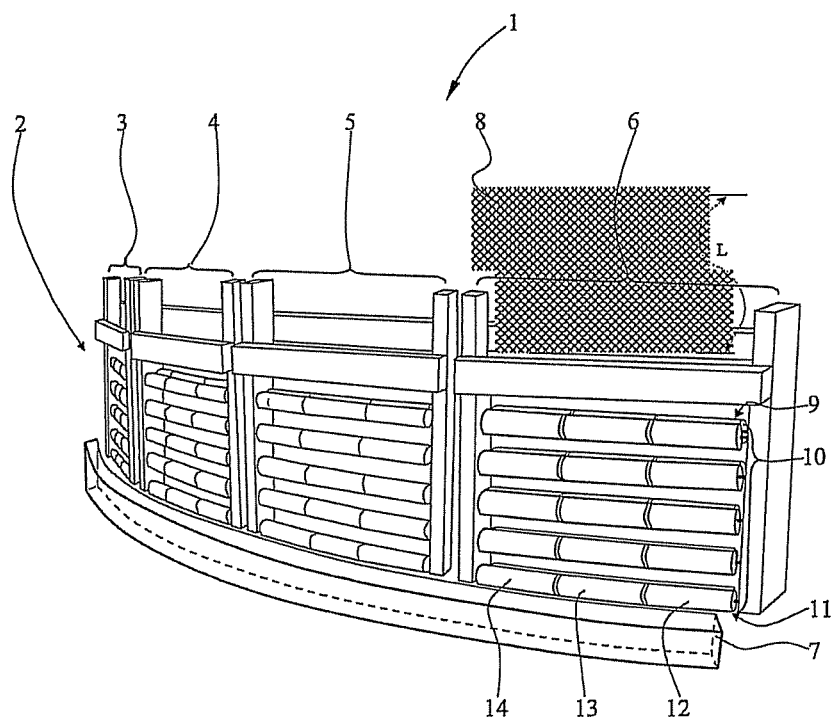
FIG. 1 is a perspective view of four cartridges of a cartridge arrangement of the device.

FIG. 1 is a perspective view of four cartridges of a cartridge arrangement of the device.

The device 1, not shown completely in FIG. 1, comprises inter alia a cartridge arrangement 2 having a total of four adjacently arranged cartridges 3 to 6. The inherently planar cartridges 3 to 6 are in each case interconnected for example with locking articulations (not shown). To follow the one-dimensional curvature of a core 7 as precisely as possible, the articulations may be released and the cartridges 3 to 6 aligned until an optimum approximation of the cartridge arrangement 2 to the predetermined curvature of the core 7 is achieved. By subsequently locking the locking articulations, this setting can be maintained for the entire laying and draping process. These locking articulations may for example be formed by self-inhibiting electric-motor servo controls. Generally speaking, adjustment is always necessary during the draping process because of the change in radius. The cartridges 3 to 6 may optionally also be formed inherently curved. In a configuration of this type, the rollers within the roller conveyors may for example extend on a flexible shaft. Alternatively, it is also conceivable to use flexible rollers having a particular inherent resilience.

The larger the number of cartridges 3 to 6 within the cartridge arrangement 2, the more precisely the path of the cartridge arrangement 2 can be adapted to the outline of the curved core, at least in the case of a non-resilient cartridge arrangement or roller conveyor. The core 7 is used for laying a portion 8, shown withdrawn in FIG. 1, of a reinforcing fiber sheet-like formation which is fully retracted into each of the four cartridges 3 to 6 and reserved for processing. In the embodiment shown, the core 7 has an approximately rectangular cross-sectional geometry, which is adapted in particular for producing profiled preforms for what are known as C-profiles and U-profiles. In principle, the core 7 may have any desired one-dimensionally and/or two-dimensionally curved surface geometry, in such a way that other preforms can also be produced for producing alternative profile geometries.

All of the cartridges 3 to 6 are constructed identically in the embodiment, and it is thus sufficient in the above to explain the basic construction of a cartridge using the example of the front cartridge 6 as a representative example for the others.

The cartridge 6 comprises two roller conveyors 9, 10, which are arranged successively with slight spacing. Each of the roller conveyors 9, 10 comprises, in the embodiment shown in FIG. 1, a total of five horizontally arranged rollers, of which one roller 11, as a representative of all the remaining identical rollers, is provided with a reference numeral. The rollers are accommodated uniformly above one another in the vertical direction so as to be rotatable in the cartridge 6. The number of rollers within each roller conveyor can be selected within wide limits and depends predominantly on a length L of the portion 8 of the reinforcing fiber sheet-like formation to be received between the roller conveyors 9, 10. In the embodiment shown in FIG. 1, the rollers are each formed in three parts, which means for example that the roller 11 is formed from a total of three partial rollers 12 to 14, which are accommodated so as to be rotatable on a common, optionally flexible shaft. At least in the case where flexible shafts are used within the roller conveyors, the rollers are formed with a resilient material or at least have a resilient casing so as not to damage the reinforcing fiber sheet-like formation received between the roller conveyors 9, 10. Materials such as rubber, felt, or a low-pile velvet formed with synthetic fibers are particularly suitable.

Preferably, each individual roller in each of the cartridges 3 to 6 has its own drive, these drives in particular being continuously electronically controllable electric motors which are integrated directly into the rollers. This makes it possible to withdraw the portions of the reinforcing fiber sheet-like formation from the cartridges 3 to 6 without stretching, distortion, or other damage to the fiber arrangement.

The entire cartridge arrangement 2 is arranged on a handling means, such as an articulated arm robot or gantry robot, so as to provide largely free positioning in space, i.e. in particular relative to the core 7. Alternatively, each individual cartridge 3 to 6 may have a positioning means of this type. In this case, an articulation between the cartridges 3 to 6 is not necessary.

According to the invention, the cartridge arrangement 2 is guided around the upper side of the core 7 by the handling means, while the portions are synchronously withdrawn from the cartridges 3 to 6 by the rollers and laid and draped on the core 7. In this way, the starts and ends of the portions of the reinforcing fiber sheet-like formation are fixed by a suitable gripping means (not shown in FIG. 1) in the region of the core 7. This laying and draping process is repeated until a predetermined number of layers of portions is achieved on the core 7.

Alongside the cartridge arrangement 2 shown in FIG. 1, the complete device 1 further comprises a blowing means and an application means for additional inter-layer fixing of the laid layers by way of a binder already present in and/or on the fiber material or a binder applied subsequently by the application means, this binder subsequently being melted by a suitable heating means (cf. in particular FIGS. 2 to 11) and consolidated by a pressing means. In this context, "consolidation" means smoothing the surface geometry of the profiled preform with simultaneous compaction, i.e. compression, and adaptation to a predetermined target surface geometry of the profiled preform. At the same time, any inclusions of air and undulations within the profiled preform are eliminated. The preform is preferably consolidated by applying a sufficiently high contact pressure using the pressing means with simultaneous cooling. The consolidation may for example be carried out automatically by at least one pressure piston, an automatically laid vacuum mat or the like, which optionally has a heat dispersal means for accelerating the cooling process after consolidation has taken place. In principle, consolidation or compaction and smoothing is required after each melting of the binder. Moreover, a comprehensive control and regulation means is present so as to make it possible for all of the processes within the device to run largely automatically.

After the completion of the laying and draping process, the profiled preforms produced by the device 1 according to the invention are laid in a moulding tool where they are fully impregnated with a curable plastics material, in particular a suitable epoxy resin system, with application of pressure and/or temperature, and subsequently cured in a temperature range between 120° C. and up to 320° C. to form a CFRP component.

Figure 2:
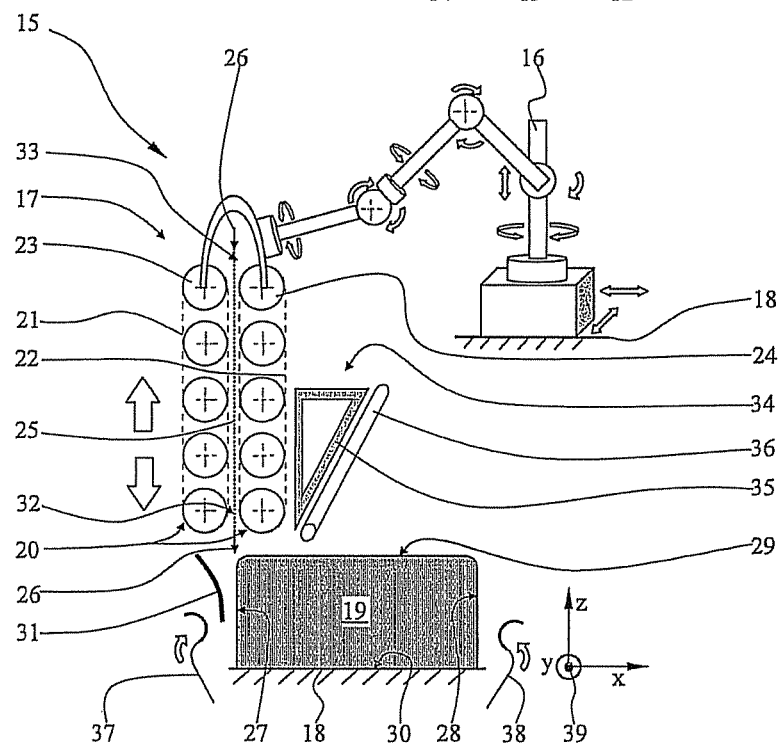
FIGS. 2 to 6 are schematic drawings of the method sequence based on a simplified representation of the device during application and draping of a portion on the core.

The device 15 shown in FIG. 2 comprises a conventional articulated arm robot 16, which has a plurality of degrees of freedom, as shown by the white direction arrows. By means of the articulated arm robot 16, a cartridge arrangement 17 can be displaced and positioned freely in space, in particular in relation to a core 19 resting on a base surface 18. For improved clarity in the drawings, the cartridge arrangement 17 comprises only one cartridge 20, which in turn is formed with two mutually parallel vertically extending roller conveyors 21, 22. Each of the roller conveyors 21, 22 comprises five rollers, of which only two rollers 23, 24 in each of the roller conveyors 21, 22 are provided with a reference numeral. The rollers 23, 24 within the roller conveyors 21, 22 are preferably driven by individually electronically controlled electric motors. A portion 25, shown by a dotted line, of a reinforcing fiber sheet-like formation is completely received between the roller conveyors 21, 22, which are arranged uniformly spaced. The portion 25 is withdrawn between the two roller conveyors 21, 22 in the direction of the small black arrow 26 by the motor-driven rollers. By way of example, the core 19 has an approximately rectangular cross-sectional geometry, with a front side 27, a core rear side 28 and a core upper side 29. A core underside 30 rests on the base surface 18 within the device 15.

In principle, the core 19 may have virtually any desired cross-sectional geometry, so as to make it possible to manufacture a wide range of variants of profiled preforms for producing CFRP reinforcing profiles. Further, the core 19 may be configured to have different degrees of curvature in at least one spatial direction, and possibly also over different portions. A conductive metal sheet 31 which facilitates the positioning of the portion 25 is arranged in the region of the core front side 27. A start 32 of the portion 25 is already located outside the cartridge 20 while the end 33 is still located within the cartridge 20.

What is known as a blowing means 34 is further arranged in the region of the cartridge arrangement 17. The blowing means 34 comprises a holder 35 and a nozzle 36, fixed inclined downwards on the holder, for outputting compressed air.

A front gripping means 37 is provided in the region of the core front side 27, and a corresponding gripping means 38 is provided in the region of a core rear side 28. Both gripping means 37, 38 are shown in a position pivoted back from the core 19, and can each be brought into contact on the core front side 27 or the core rear side 28 by pivoting in the direction of the small white curved arrows by means of actuators (not shown), so as to grip the start 32 or the end 33 of the portion 25 in place. Gripping the portion 25 in place further makes it possible to lay the portion 25 around the core 19 under preferably low tension by means of the cartridge arrangement 17 arranged on the articulated arm robot 16, and in doing so simultaneously to drape said portion, in particular in curved regions. A coordinate system 39 is provided to illustrate the movements of the cartridge arrangement 17 in space.

In the drawing of FIG. 2, the cartridge arrangement 17 has already been brought into position in relation to the front side 27 of the core 19 in such a way that the portion 25 can be withdrawn from the cartridge 20 by means of the motor-driven rollers to start a laying and draping process.

In addition, the sequence of the method for producing a profiled preform is to be explained in greater detail by way of FIGS. 2 to 6 using a schematically depicted device. In FIGS. 2 to 6, constructionally equivalent elements are provided with like reference numerals in each case. For reasons of clarity, the articulated arm robot 16 has not been shown in FIGS. 3 to 6.

Figure 3:
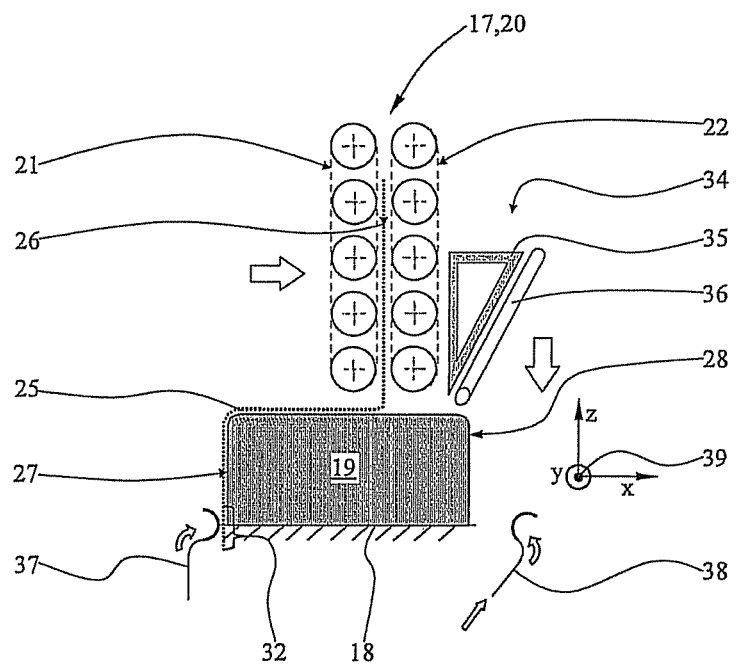

Starting from the position shown in FIG. 2, the portion 25 is withdrawn vertically from the cartridge 20 by means of the rollers, until the start 32 of the portion 25 has progressed far enough to project downwards slightly beyond the core front side 27 and can be gripped in place by means of the front gripping means 37, as shown in FIG. 3. Alternatively, the start 32 may also end flush with the core front side 27.

Figure 4:
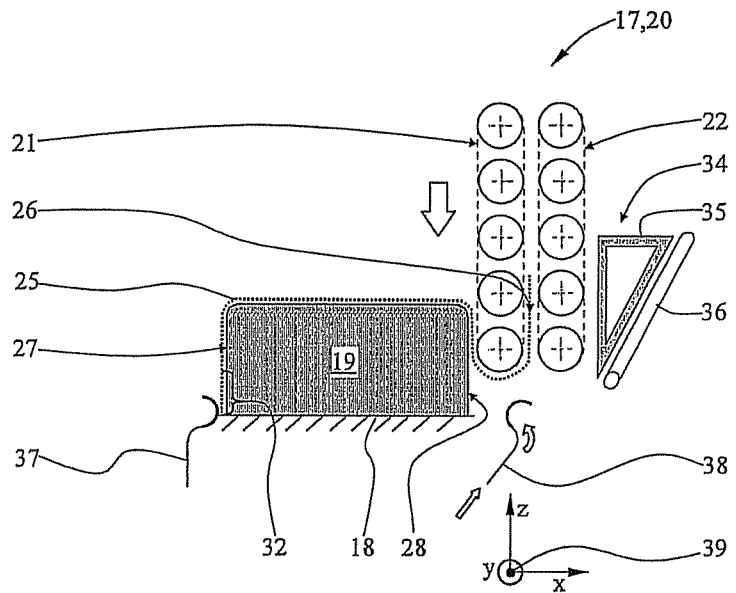
Figure 5:
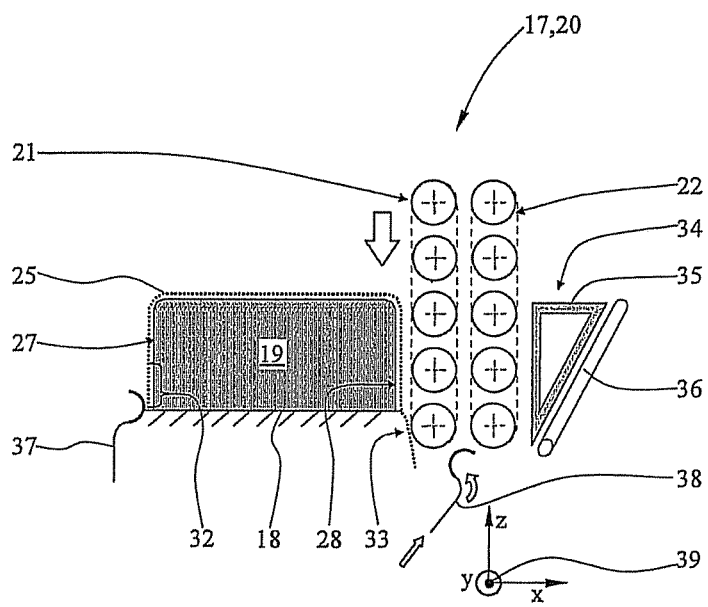

Subsequently, the entire cartridge arrangement 17 is displaced vertically upwards, i.e. parallel to the z-axis of the coordinate system 39, by means of the articulated arm robot 16, and slid in the horizontal direction, i.e. parallel to the x-axis, as shown in FIGS. 3 and 4 so as to pull the portion 25 over the core front side 27 and the core upper side 29. Depending on the local curvature of the core 19, the portion 25 of the reinforcing fiber sheet-like formation is simultaneously draped. During the movements of the cartridge arrangement 17, which are illustrated by the white direction arrows in all of the figures, the portion 25 received between the roller conveyors 21, 22 is ideally conveyed out of the cartridge arrangement 17 synchronously in the direction of the small black arrow 26 by means of the motor-driven rollers. In FIG. 5, the cartridge arrangement 17 has reached the end position thereof in relation to the core 19 after completing a vertical downwards movement, and the end 33 of the portion 25 is in contact with the region of the core rear side 28.

Figure 6:
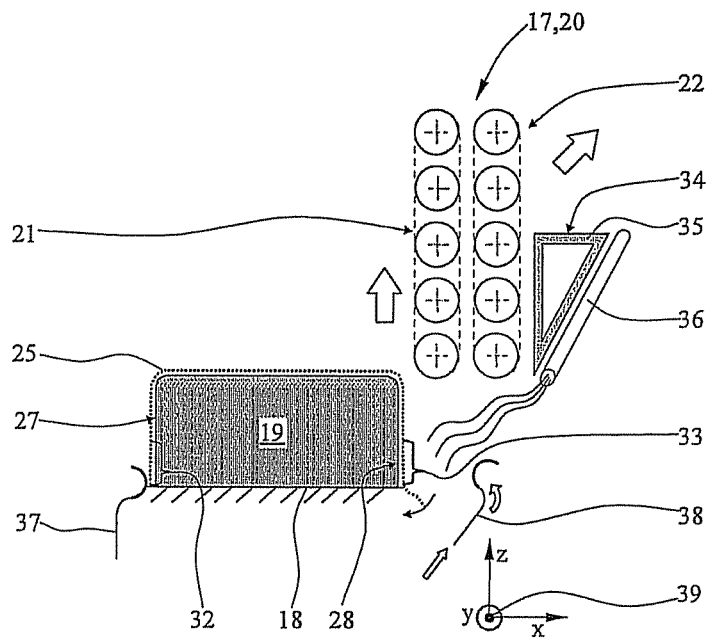

FIG. 6 illustrates how compressed air exits the nozzle 36 of the blowing means 34, and as a result, the end 33 of the portion 25, excluding a small excess, is brought into contact with the core rear side 28. Subsequently, the laid and draped portion 25 can be fixed in position by the rear gripping means 38 (cf. in particular FIG. 7). The use of compressed air prevents damage to the integrity of the fiber arrangement of the portion 25.

Figure 7:
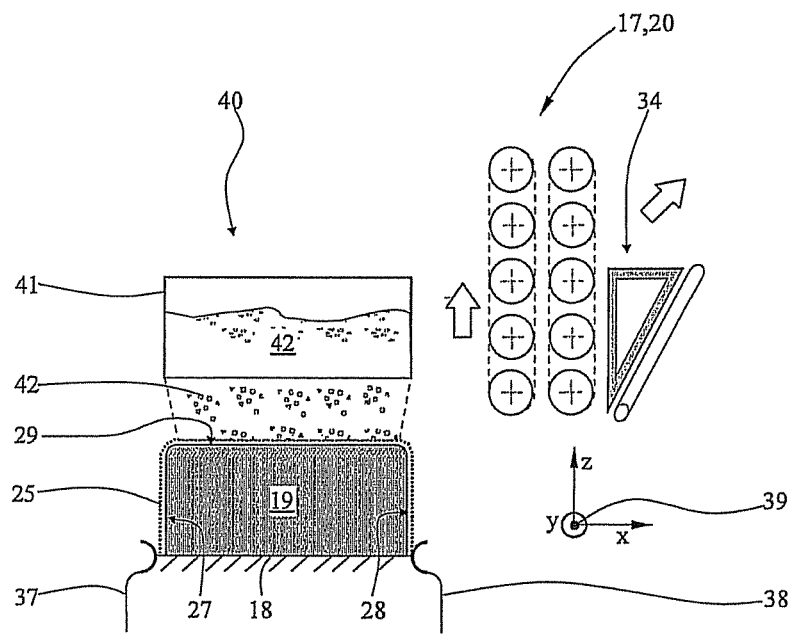
FIG. 7 shows the optional application of a binder by an application means.

FIG. 7 shows how the binder 42 can be applied as uniformly as possible over the entire surface of the portion 25 in the region of the core upper side 29 by means of an application means 40 which comprises for example a container 41 having a binder 42. For this purpose, the cartridge arrangement 17 or in this case the individual cartridge 20 is withdrawn from the working region of the application means 40. The binder 42 is preferably a fine thermoplastic granulate, which can be melted even at low temperatures. In this method step, the portion 25 is gripped in place on the core 19 by the gripping means 37, 38. Alternatively, the binder 42 may also be applied in the region of the portion 25 lying on the core front side 27 and the core rear side 28.

Figure 8:
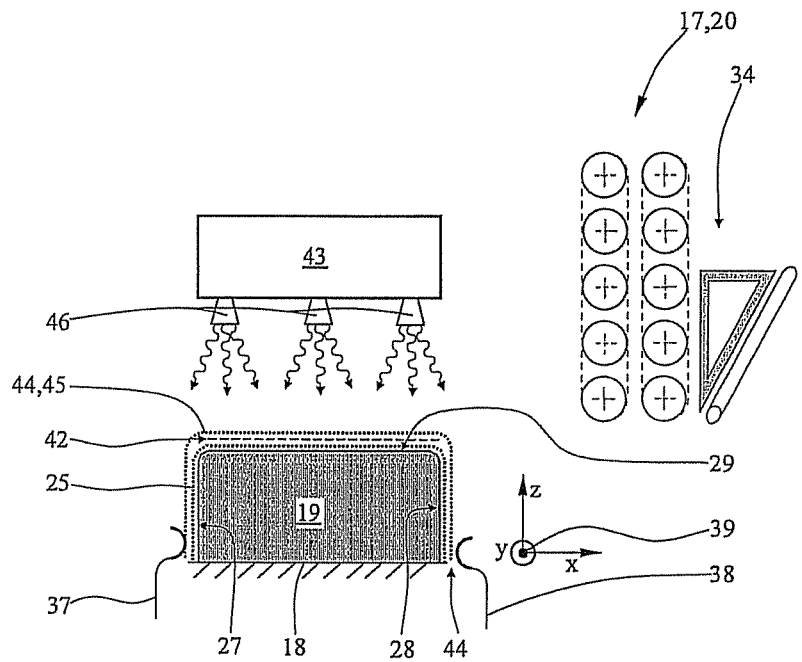
FIG. 8 shows the melting of the binder.

In the process step according to FIG. 8, a further layer 44 of a portion 45 of the reinforcing fiber sheet-like formation has been laid and draped on the portion 25 with the applied binder 42. Subsequently, a heating means 43 is positioned above the core 19 with appropriate spacing. The heating means 43 has a plurality of infrared emitters 46 arranged in a matrix, which may for example be formed by ceramic plates having embedded electrical heating wires or other suitable radiation sources. The heating means 43 may operate by inductive heating. As a result of the matrix arrangement of the infrared emitters 46 below the heating means 43, rapid and above all uniform heating of the binder 42 to the melting point thereof is provided. Moreover, the infrared emitters 46 also make rapid cooling of the binder 42 possible, preventing uncontrolled running of the binder 42 between the layers 44. To smooth the surface of the laid layers after activating the binder 42, at least one plunger (not shown) may be provided, the size and arrangement of which correspond to a target surface geometry of the laid reinforcing fiber sheet-like formation. The plunger or plungers can preferably be actively temperature controlled, i.e. they are equipped with a heating means and/or with a cooling means. Both the heating means and the cooling means may for example be formed by continuous holes in the plungers through which a correspondingly temperature-controlled fluid is guided, for example an oil or a gas. Alternatively, resistance and induction heating systems and cooling means having Peltier elements may be provided.

Figure 9:
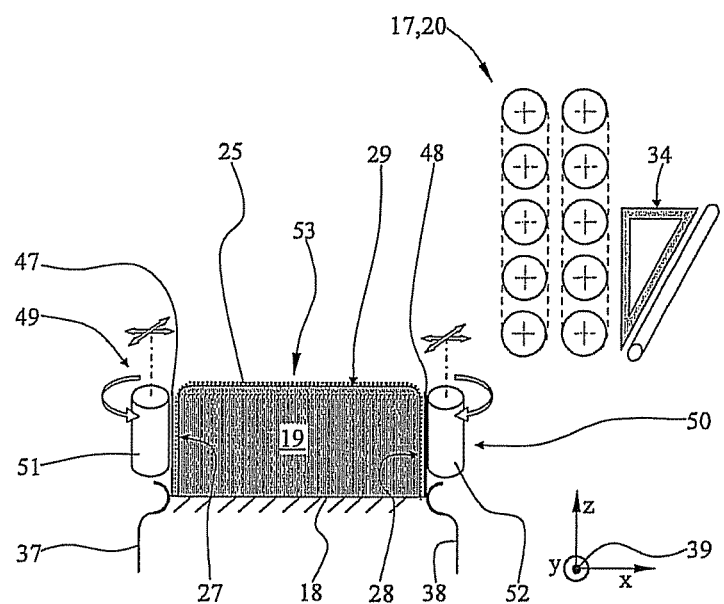
FIG. 9 shows an optional application of reinforcing fibers having a 0° orientation.

FIG. 9 shows how two optional web-form reinforcing fiber arrangements 47, 48 are laid on the portion 25 by means of two rolling means 49, 50 in the region of the core front side 27 and the core rear side 28. The two rolling means 49, 50 comprise inter alia in each case a reserve roll 51, 52 from which the continuous reinforcing fiber arrangement 47, 48 can be withdrawn continuously. The rolling means 49, 50 optionally also have a cutting means (not shown) so as to be able to cut the reinforcing fiber arrangement 47, 48 to length at a predetermined dimension. The two rolling means 49, 50 are moved substantially parallel to the y-axis of the coordinate system 39 by a handling means, for example a conventional articulated arm robot. To provide a laying and draping process with as little tension and distortion as possible, the reserve rolls 51, 52 rotate synchronously with the linear movement of the rolling means 49, 50 along the y-axis.

The two reinforcing fiber arrangements 47, 48 are preferably formed with a plurality of carbon fibers which extend in what is known as the 90° direction, i.e. parallel to the y-axis of the coordinate system 39 in the drawing of FIG. 9. By contrast, the portion 25 is what is known as a multiaxial carbon fiber laid fabric, in which the individual carbon fibers extend layered alternately above one another directed at an angle of ±45° and 0°. This means that for example in the region of the portion 25 lying on the core upper side 29, the carbon fibers of the multiaxial laid fabric extend substantially within or parallel to the xy plane of the coordinate system 39 and in doing so form an angle of ±45° or 0° with the x-axis or the y-axis respectively.

Integration of these web-form reinforcing fiber arrangements 47, 48 is optional and is generally only carried out when producing profiled preforms for specific tasks, for example for use as annular former segments for reinforcing fuselage cell structures of aircraft. Advantageously, the reinforcing arrangements are covered on both sides in the preferred 0° direction by at least one layer in each case of the portion 25, 45 of the multiaxial fiber laid fabric, so as to achieve optimum surface properties of the subsequent composite component, although for improved clarity this is not shown in FIG. 9. The completion of the process step according to FIG. 9 ends the actual construction of a profiled preform 53, which is formed by a plurality of portions 25, 45, laid and draped on top of one another, of the multiaxial fiber laid fabric and a reinforcing fiber arrangement, with 0° layers optionally laid in between.

This profiled preform 53 having a complex carbon fiber reinforcing structure is automatically removed from the core 19 by means of a further handling means and laid in a correspondingly formed, generally multipart moulding tool, which is subsequently sealed tight. A curable plastics material is subsequently introduced into the moulding tool to form a matrix which fully encloses the profiled preform. The plastics material, in particular a suitable epoxy resin system, is subsequently cured with simultaneous application of pressure and/or temperature to form the CFRP component or CFRP profile, which can be removed from the tool after the tool has cooled. Before the profiled preform 53 is introduced into the multipart moulding tool to carry out the RTM process described above, it may be necessary to separate off excess material by trimming, in particular in the region of the corners of the profiled preform 53, so as to provide the required high dimensional accuracy. Moreover, it may be necessary also to subject the final cured CFRP component to a final cutting process so as to bring it definitively to size.

Figure 10:
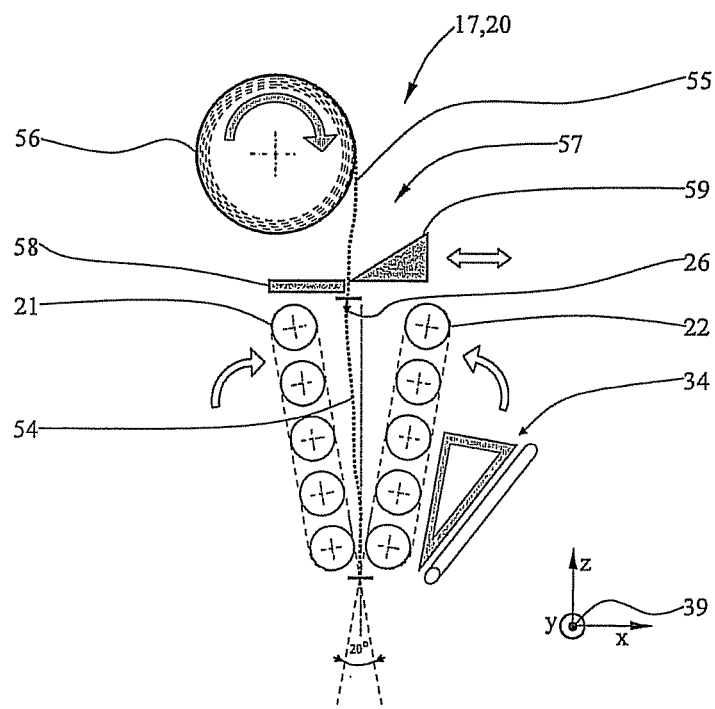
FIG. 10 shows a cartridge within a cartridge arrangement being loaded with a portion of the reinforcing fiber sheet-like formation.

FIG. 10 shows how the cartridge arrangement 17 or the separate cartridge 20 is loaded, preferably fully automatically, with a new portion 54 of the reinforcing fiber sheet-like formation 55 after a portion has been laid and draped on the core 19.

For this purpose, the roller conveyors 21, 22 may, as is outlined in FIG. 10, be folded apart by a small angle, for example by 10° each, to facilitate the introduction of the sheet-like formation 55. By rolling the sheet-like formation 55 off the reserve roll 56 in the direction of the small black arrow, the portion 54 to be separated is brought between the two roller conveyors 21, 22. Subsequently, the roller conveyors 21, 22 are folded together again in the direction of the white curved arrows, i.e. the roller conveyors 21, 22 extend approximately mutually parallel and the reinforcing fiber sheet-like formation 55 is received in between.

Subsequently, the portion 54 is separated from the reinforcing fiber sheet-like formation 55 by a cutting means 57. The fully automatic cutting means 57 has inter alia a counter bearing 58 and a cutting blade 59, for example. The portion 54 is separated by a horizontal movement of the cutting blade 59 in the direction of the horizontal white double-headed arrow. Alternatively, the separation may for example be carried out by a water or laser means.

Subsequently, the cartridge 20 can be repositioned in relation to the core 19 by the handling means, and the new portion 54 can be laid and draped on the core 19 as illustrated in FIGS. 3 to 8. This process is repeated until a predetermined number of layers of portions of the reinforcing fiber sheet-like formation and/or of the web-form reinforcing fiber arrangements is achieved within the profiled preform 53 to be formed on the core 19.

Preferably, the moulding tool, for infiltrating the profiled preform 53 with the curable plastics material and for carrying out the RIM process, and the heating means, for temperature-controlling the moulding tool, and the injection means for the curable plastics material, including all auxiliary means required therefor, are directly integrated into the device for carrying out the method.

LIST OF REFERENCE NUMERALS 1 device
2 cartridge arrangement
3 cartridge ⎫
4 cartridge ⎬ cartridge arrangement (4 cartridges)
5 cartridge ⎪
6 cartridge ⎭
7 core (one-dimensionally curved)
8 portion (reinforcing fiber sheet-like formation)
9 roller conveyor
10 roller conveyor
11 roller
12 partial roller
13 partial roller
14 partial roller
15 device
16 articulated arm robot
17 cartridge arrangement
18 base surface (device)
19 core (one-dimensionally curved)
20 cartridge
21 roller conveyor
22 roller conveyor
23 roller
24 roller
25 portion (reinforcing fiber sheet-like formation)
26 arrow
27 core front side
28 core rear side
29 core upper side
30 core underside
31 conductive metal sheet
32 start (portion)
33 end (portion)
34 blowing means
35 holder (blowing means)
36 nozzle (blowing means)
37 front gripping means
38 rear gripping means
39 coordinate system
40 fixing means
41 container
42 binder
43 heating means
44 layer (second portion)
45 portion (second portion of the reinforcing fiber sheet-like formation)
46 infrared emitter
47 reinforcing fiber arrangement (web-form)
48 reinforcing fiber arrangement (web-form)
49 rolling means
50 rolling means
51 reserve roll
52 reserve roll
53 profiled preform
54 portion (reinforcing fiber sheet-like formation)
55 reinforcing fiber sheet-like formation
56 reserve roll
57 cutting means
58 counter bearing
59 cutting blade

The invention claimed is:

1. An assembly comprising a device for automatically laying and draping a plurality of web-form portions of a sheet-like formation comprising a multiaxial fiber laid fabric and/or a woven reinforcing fabric, to produce a profiled preform on a core; and a core for receiving said plurality of web-form portions, the core resting on a base surface and having at least a one-dimensional curvature, wherein said device for automatically laying and draping a plurality of web-form portions of a sheet-like formation is adapted to produce said profiled preform on said core by repeatedly laying and draping the portions, to produce a reinforcing profile by impregnating the profiled preform with a curable plastics material in a moulding tool, wherein at least one portion is held ready for laying on the core in at least one cartridge between two roller conveyors, wherein the at least one portion is cut to the correct length and receivable in its entire length between the two roller conveyors, wherein at least a first cartridge, a second cartridge and a third cartridge are arranged in series, the first cartridge being arranged adjacent to the second cartridge and the second cartridge being arranged adjacent to the third cartridge, wherein the first, second and third cartridges are mutually articulated with locking articulations to form a cartridge arrangement, said locking articulations comprising a first locking articulation being arranged between the first cartridge and the second cartridge directly interconnecting the first cartridge and the second cartridge, and a second locking articulation being arranged between the second cartridge and the third cartridge directly interconnecting the second cartridge and the third cartridge, wherein the first, second and third cartridges are pivotable with respect to each other about a vertical axis of the cartridge arrangement by the locking articulations, the articulations being releasable and the at least first, second and third cartridges being alignable to the at least one-dimensional curvature of the core so as to follow any desired curvature of the core.

2. The assembly according to claim 1, wherein the cartridges are positionable freely in space by an articulated arm robot and/or a gantry robot, having at least six degrees of freedom.

3. The assembly according to claim 1, wherein the core has a U-shaped, a Z-shaped, an L-shaped, an I-shaped cross-sectional geometry, or any combination thereof, so as to produce a profiled preform for an at least singly curved reinforcing profile.

4. The assembly according to claim 1, wherein a web-form reinforcing fiber arrangement is layable in the region of the core front side and/or the core rear side by at least one roll which is positionable freely in space.

5. The assembly according to claim 1, wherein a distance between every two roller conveyors in at least one cartridge is adjustable.

6. The assembly according to claim 1, wherein each roller conveyor comprises a plurality of cylindrical rollers.

7. The assembly according to claim 1, wherein the roller conveyors are formed with a resilient material comprising a rubber material, a foamed plastics material, a pile or any combination thereof.

8. The assembly according to claim 1, wherein a blowing structure working with compressed air is provided in the region of at least one cartridge.

9. The assembly according claim 1, wherein an applicator being a distribution structure containing a binder, is provided, the binder being a thermoplastic powder which is meltable by a heating system.

10. The assembly according to claim 1, wherein at least one temperature-controllable pressing structure is provided for consolidating the profiled preform.

* * * * *